United States Patent [19]

Viall, Jr.

[11] Patent Number: 4,852,917
[45] Date of Patent: Aug. 1, 1989

[54] TUBING CONNECTOR WITH FLOATING SPOOL

[75] Inventor: Wilton S. Viall, Jr., Des Moines, Wash.

[73] Assignee: The Boeing Company, Seattle, Wash.

[21] Appl. No.: 199,125

[22] Filed: May 26, 1988

[51] Int. Cl.⁴ .............................................. F16L 19/02
[52] U.S. Cl. ..................................... 285/353; 285/371
[58] Field of Search ................ 285/347, 353, 371, 398

[56] References Cited

U.S. PATENT DOCUMENTS

| | | | |
|---|---|---|---|
| 333,413 | 12/1885 | Hoeveler | 285/398 X |
| 605,098 | 6/1898 | Hammer | 285/353 X |
| 933,584 | 9/1909 | Rick | 285/353 X |
| 2,340,732 | 2/1944 | Bruno | 285/36 |
| 2,739,828 | 3/1956 | Schindler et al. | 285/90 |
| 2,862,731 | 12/1958 | Hedden et al. | 285/272 |
| 2,900,199 | 8/1959 | Logan | 285/187 |
| 2,913,261 | 11/1959 | Matchett | 285/175 |
| 3,044,657 | 7/1962 | Horten | 285/398 X |
| 3,216,747 | 11/1965 | Green | 285/110 |
| 3,307,861 | 3/1967 | Adam et al. | 285/334.2 |
| 3,372,949 | 3/1968 | McLay | 285/364 |
| 3,679,237 | 7/1972 | De Angelis | 285/353 X |
| 3,937,501 | 2/1976 | Weinhold | 285/365 |
| 4,691,944 | 9/1987 | Viall, Jr. | 285/348 |

FOREIGN PATENT DOCUMENTS

| | | | |
|---|---|---|---|
| 261305 | 5/1963 | Australia | 285/353 |
| 884153 | 1/1943 | France | 285/353 |
| 341685 | 11/1959 | Switzerland | 285/353 |
| 588902 | 6/1947 | United Kingdom | 285/353 |
| 1071772 | 6/1967 | United Kingdom | 285/363 |
| 1072340 | 6/1967 | United Kingdom | 285/353 |

*Primary Examiner*—Peter R. Brown
*Attorney, Agent, or Firm*—Joan H. Pauly

[57] ABSTRACT

Each of two sections of tubing (4) has a ferrule (8) swaged onto its end. The ferrule (8) forms an outwardly directed radial flange (12) and an axial extension (14) projecting axially outwardly from a peripheral portion of the flange (12). The sections (4) are coaxially aligned. A hollow spool (20) is positioned between the flanges (12) and within the extensions (14). Opposite radial end walls (26) and a center land (28) on the outer circumferential surface of the spool (20) form two recesses (30). An O-ring seal (34) is positioned in each recess (30). There is clearance between the spool (20) and both the flanges (12) and the extensions (14). The spool (20) floats on the seals (34) which are radially compressed between the recess walls and the extensions (14). A nut assembly secures the flanges (12) together.

4 Claims, 2 Drawing Sheets

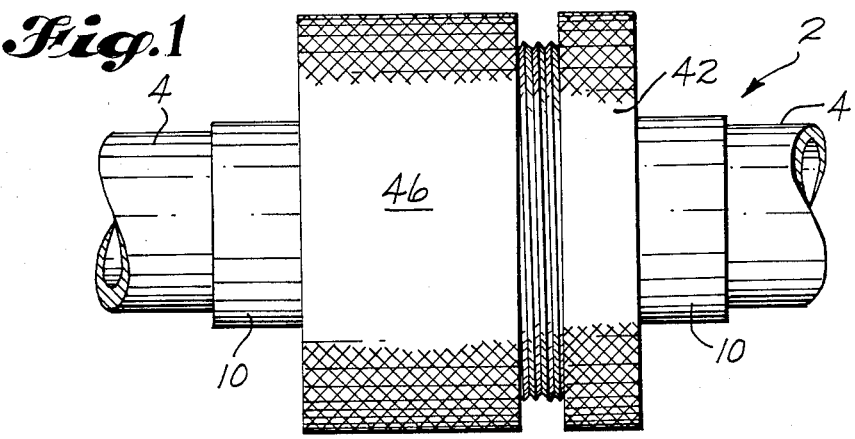
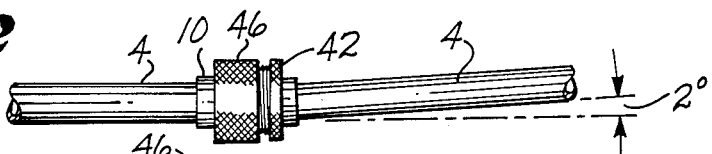
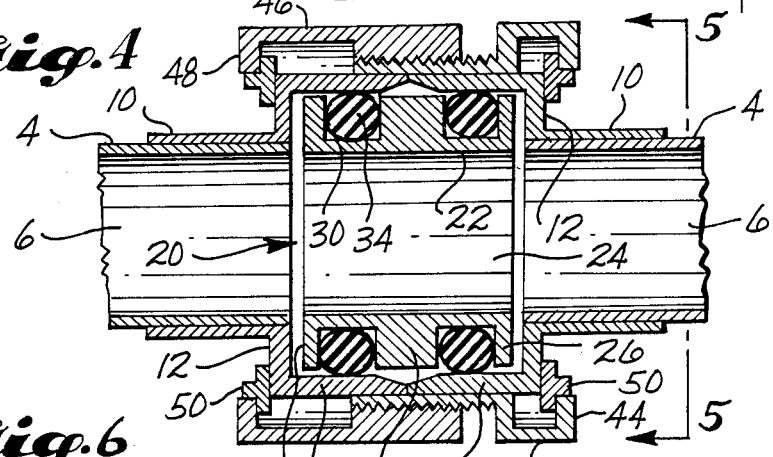
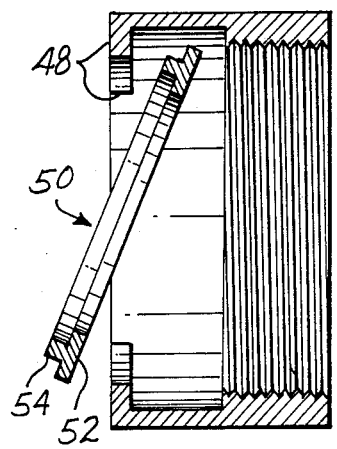
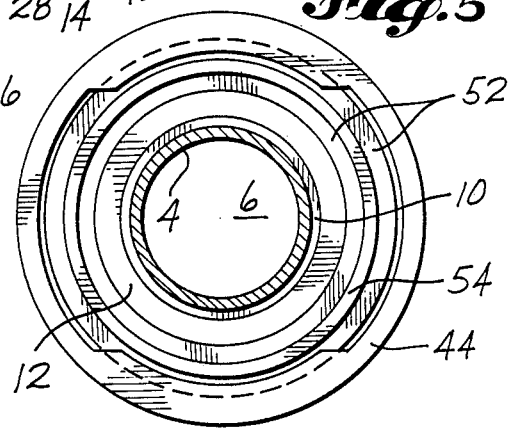

TUBING CONNECTOR WITH FLOATING SPOOL

DESCRIPTION

1. Technical Field

This invention relates to connectors for fluid conveying tubing and, more particularly, to such a connector in which the tubing ends to be connected have radial flanges with axial extensions, and a spool positioned between the radial flanges with the axial extensions floats on O-ring seals to accommodate relative deflections of the tubing ends.

2. Background Art

The term "fluid", as used herein, means either a liquid or a gas.

Modern aircraft typically have a large number of fluid conduit systems, such as fuel, hydraulic, and pneumatic conduit systems. Each of these systems has a number of tubing connectors. The connectors are continually subjected to external forces and/or vibrations that tend to deflect the connected tubing ends out of axial alignment with each other. A problem that has arisen in relation to the use of conventional connectors is that the deflections of the tubing ends eventually result in a failure of the seals in the connector and consequent leakage of fluid from the system. In an aricraft environment, such leakage is generally unacceptable.

U.S. Pat. No. 4,691,944, granted Sept. 8, 1987, to the present applicant, discloses one approach to the solution of the problem of preventing leakage. This patent discloses a tubing connector in which the end of each tubing section to be connected has an outwardly directed radial flange. A concentric sleeve surrounds the tubing section inwardly of the flange. An O-ring is positioned between the outer radial end of the sleeve and the flange and is compressed therebetween by first and second connector rings. The connector rings threadedly engage each other and engage the sleeves on the two tubing portions to urge the sleeves against the O-rings. FIG. 2 of the patent shows a prior art connection in which flanged metallic rings are swaged onto the tubing section ends.

U.S. Pat. No. 2,862,731, granted Dec. 2, 1958, to R. R. Hedden et al., discloses a swivel coupling for fluid handling tubes. The coupling includes two tubular body sections that are threadedly connected to the facing ends of the tubes. The tubular bodies have outwardly directed radial flanges. An outer coupling member is formed around the radial flanges to urge them together. An inner coupling member is received in counterbores formed on inner surface portions of the tubular bodies. The inner member is designed to maintain the body sections in axial alignment and to prevent radial shifting thereof. It also serves to stiffen the swivel connection. An O-ring is positioned between the inner coupling member and each of the tubular bodies. In a first embodiment, each O-ring is positioned in a recess opening onto the radial end surface and the outer circumferential surface of the inner coupling member. In a second embodiment, each O-ring is recived in a recess formed on the inner circumferential surface of the corresponding tubular body.

U.S. Pat. No. 2,900,199, granted Aug. 18, 1959, to S. E. Logan, discloses a sealed connection for two pipe ends in a hydraulic piping system. Each pipe end has an outwardly directed radial flange formed either separately or integrally. A plurality of axially aligned holes extend through the flanges for receiving fasteners to secure the flanges and the sections together. The mating end surfaces of the pipe ends have annular grooves formed therein which together form an opening for receiving a hybrid gasket member. The gasket member includes an inner metal spacer ring and an outer seal ring which is bonded to the inner ring. In one alternative embodiment, there are two seal rings bonded to radial surfaces of the center spacer ring, instead of a single seal ring bonded to the outer circumferential surface of the spacer ring. In another embodiment, the spacer ring has a t-shaped cross section, and two seal rings are placed on opposite sides of the T-legs outwardly of the T-head.

U.S. Pat. No. 3,372,949, granted Mar. 12, 1968, to J. F. McLay, discloses a joint construction for glass pipe. In the joint, the bell-shaped pipe ends form facing annular recesses. A coupling sleeve is interference fit into these recesses with the facing radial surfaces of the pipe ends spaced from each other. Two annular grooves are formed on the outer circumferential surface of the sleeve. An O-ring is received into each of these grooves and seals against the corresponding pipe end. The pipe ends are held together by a pinch clamp or a flange and bolt clamp.

U.S. Pat. No. 3,937,501, granted Feb. 10, 1976, to K. Weinhold, discloses a pipe coupling in which radial flanges are welded onto the pipe sections, spaced from the pipe ends. A coupling sleeve is received onto the pipe ends between the flanges. The internal diameter of the sleeve is the same as the external diameter of the pipe ends. The flanges are held together by a spacer strip and bolt arrangement. In the assembled joint, there is axial clearance between the sleeve and the flanges and between the facing pipe ends. The sleeve has two inwardly facing annular grooves which receive seals that engage the outer circumferential surfaces of the pipe ends.

British Patent Specification No. 1,071,772, published June 14, 1967, and British Patent Specification No. 1,072,340, published June 14, 1967, which was a divisional of Patent Specification No. 1,071,772, disclose a demountable pipe coupling. In the coupling, the ends of the pipe have integral radial flanges that are held together by a two-part nut. The outer radial ends of the flanges abut and together form an inner annular recess. An annular seal is positioned in a radially outer portion of the recess axially between the two flanges. A tubular junction piece is received into a radially inner portion of the recess and abuts the seal and circumferential surface of the recess.

Connectors for fluid conduits are disclosed in U.S. Pat. Nos. 2,739,828 granted Mar. 27, 1956, to F. S. Schindler et al.; No. 2,913,261, granted Nov. 17, 1959, to J. C. Matchett; No. 3,216,747, granted Nov. 9, 1965, to K. D. Green; and No. 3,307,861, granted Mar. 7, 1967, to J. W. Adam et al. Each of the connectors includes a seal positioned between facing flanged tube ends. U.S. Pat. No. 2,340,732, granted Feb. 1, 1944, to W. A. Bruno, discloses coupling means for tubular electrical conductors. The coupling means includes a ring member positioned axially between end flanges on the conductor sections. In one embodiment, a seal is positioned between removable flanged members which are held together by a nut and surround the tubing ends and the ring member.

The above patents and the prior art that is discussed and/or cited therein should be studied for the purpose of putting the present invention into proper perspective relative to the prior art.

DISCLOSURE OF THE INVENTION

The subject of the invention is a tubing connector. According to an aspect of the invention, the connector comprises first and second sections of tubing. Each section comprises a cylindrical sidewall defining a central fluid conveying passageway, and an end portion. The end portion includes an annular outwardly directed radial flange and an annular axial extension projecting axially outwardly from a peripheral portion of the radial flange. The sections are substantially coaxially aligned with their flanges directed toward each other. The connector further comprises an annular spool with an inner cylindrical sidewall portion defining a central axial opening. First and second end walls project radially outwardly from opposite ends of the sidewall portion. A center land portion projects radially outwardly from the sidewall portion between the end walls. The land portion and the end walls define therebetween first and second outwardly opening radial recesses. The spool is dimensioned to be received between the radial flanges of the tubing sections within the axial extensions. When the spool is in position, the axial opening is aligned with the fluid conveying passageways in the tubing sections, and there is clearance between the spool and the radial flanges and between the spool and the axial extensions. First and second annular seals are positioned in the first and second recesses, respectively. The seals sealingly engage the sidewall portion of the spool and the axial extensions of the first and second sections of tubing, respectively. The connector also has means for engaging the radial flanges to detachably secure the tubing sections together.

A preferred feature of the invention is axial extensions that have outer radial end surfaces which abut each other to define the axial distance between the radial flanges. This feature helps ensure that a desired minimum axial clearance between the spool and the radial flanges is maintained. It also assists in the assembly of the connector. When the connection is being hand tightened, the operator can feel when the end surfaces reach their abutting position and, thereby, is given a positive indication that the connection is secure.

Connectors constructed according to the invention solve the problem of reliably maintaining a sealed connection in conduit systems which are subjected to forces tending to deflect joined sections of tubing relative to each other. The clearance between the spool and the radial flanges and the axial extensions creates a floating fit of the spool, i.e. the spool floats on the seals. This allows deflections of the joined tubing sections relative to each other without adversely affecting the seal interface, and thereby prevents failure of the seal and consequent leakage of fluid from the system. The floating fit of the spool also permits the tubing ends to be secured together by the connector when they are not precisely aligned with each other.

The structure of the spool with the opposite end walls, prevents displacement of the seals during assembly of the connector and pinching of the seals between the spool and the tubing ends. The structure of the spool also makes it possible to store the spool and the seals together as a unit ready for installation.

The connector of the invention may be used with standard tube ends. This may be accomplished, for example, by swaging a ferrule onto the cylindrical sidewall of each section of tubing so that the ferrule forms the radial flange and axial extension. The connector of the invention may also be used with standard O-rings to help minimize the cost of the connector and maximize the availability of replacement parts. Connectors constructed according to the invention also have the advantages of being simple in structure and inexpensive to manufacture and install. The connector of the invention may be readily assembled and does not require parts which are likely to be dropped and lost during assembly.

These and other advantages and features will become apparent for the detailed description of the best mode for carrying out the invention that follows.

BRIEF DESCRIPTION OF THE DRAWINGS

In the drawings, like element designations refer to like parts throughout, and:

FIG. 1 is an elevational view of the preferred embodiment of the connector.

FIG. 2 is an elevational view of two sections of tubing joined by the connector shown in FIG. 1, illustrating deflection of one of the sections.

FIG. 4 is a sectional view of the connector shown in FIG. 1.

FIG. 5 is an end view taken along the line 5—5 in FIG. 4, with the tubing sidewall shown in section.

FIG. 6 is a sectional view of the nut and one of the retainer rings shown in FIG. 4, illustrating the attachment of the ring to the nut.

BEST MODE FOR CARRYING OUT THE INVENTION

Figure 3:
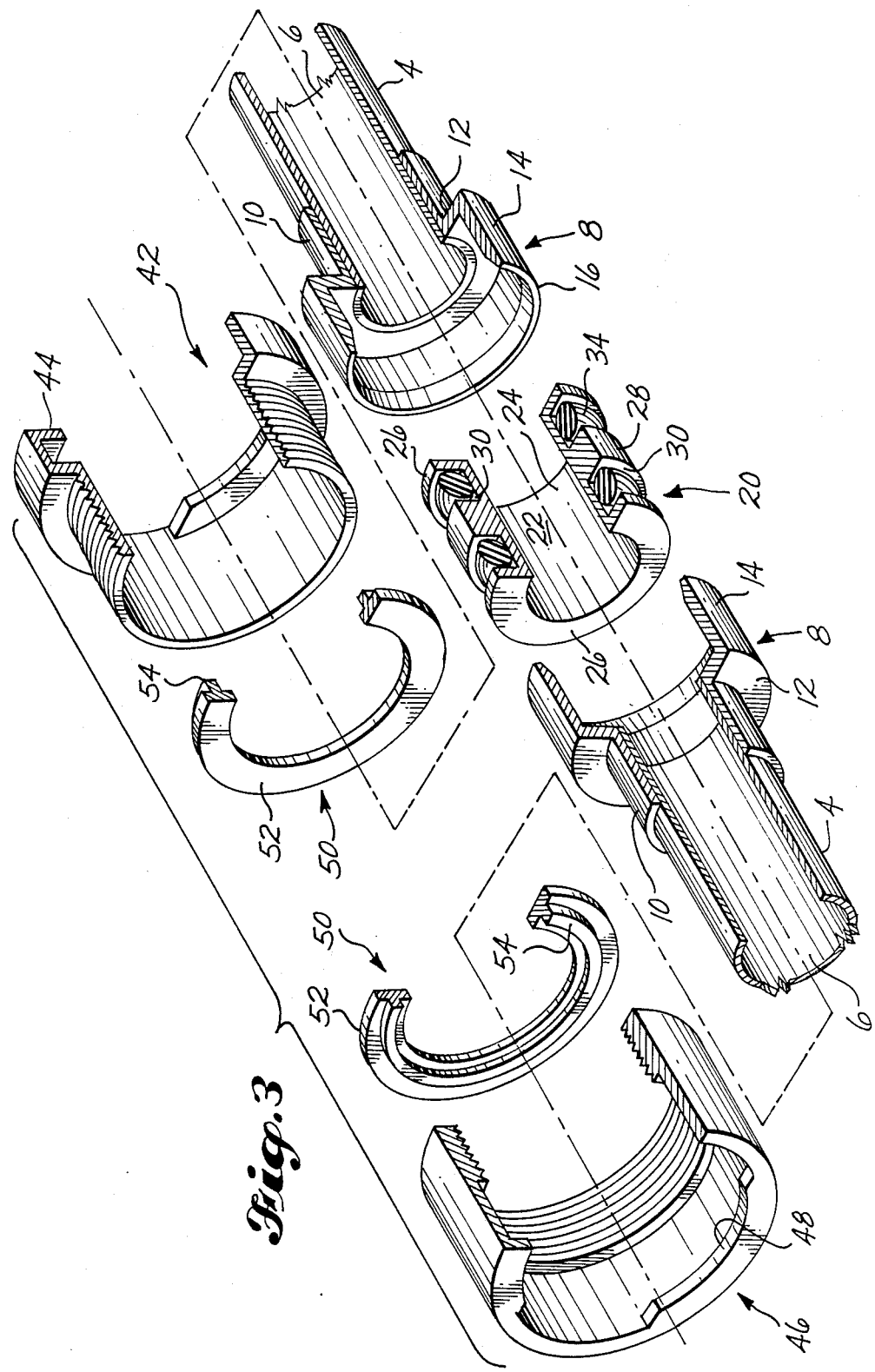
FIG. 3 is an exploded pictorial view of the connector shown in FIG. 1.

The drawings show a connector 2 that is constructed according to the invention and that also consitutes the best mode for carrying out the invention currently known to the applicant.

As shown in FIGS. 1-5, the connector 2 comprises two sections of tubing 4. Each section 4 has a cylindrical sidewall which defines a central fluid conveying passageway 6. The sections 4 shown in the drawings are essentially identical. It is anticipated that in most applications of the invention the tubing ends joined will be essentially identical. However, it is intended to be understood that the connector of the invention may be used to join unlike sections of tubing without departing from the spirit and scope of the invention. The structure of the connector is very versatile and may easily be adapted to join unlike sections.

The end portion of each tubing section 4 has a ferrule 8 swaged thereon. The ferrule 8 has an inner annular axial portion 10 which is swaged onto the tubing end. An annular radial flange 12 projects radially outwardly from the axially outer end of the axial portion 10. An annular axial extension 14 projects axially outwardly from the outer periphery of the radial flange 12.

The preferred method for forming the tubing ends to be joined is to swage a ferrule onto a cylindrical section of tubing, as shown in the drawings and described above. This procedure permits the use of standard cylindrical tubing and swaging procedures. However, the sidewall, flange, and extension could also be formed integrally, or the elements could be joined by a procedure other than swaging, without departing from the spirit and scope of the invention.

In the assembled connector 2, shown in FIGS. 1, 2, 4, 5 and 5, the sections of tubing 4 are substantially aligned with each other with their radial flanges 12 directed toward each other. Preferably, the outer radial end surfaces 16 of the axial extensions 14 abut each other. The abutting extensions 14 define the axial distance between the radial flanges 12.

An annular spool 20 is positioned between the radial flanges 12 and within the axial extensions 14. The spool 20 has an inner cylindrical sidewall portion 22 that defines a central axial opening 24. An end wall 26 projects radially outwardly from each axial end of the sidewall portion 22. A center land 28 projects radially outwardly from the sidewall portion 22 between the end walls 26. Preferably, the end wall 26 and the land 28 have the same radial extend, as shown in FIGS. 3 and 4. An outwardly opening radial recess 30 is formed between each end wall 26 and the center land 28.

The spool 20 is dimensioned to be received between the radial flanges 12 and within the axial extensions 14, with the opening 24 aligned with the passageways 6 formed by the tubing sections 4, and with clearance between the spool 20 and the radial flanges 132 and between the spool 20 and the axial extensions 14. An O-ring seal 34 is positioned in each of the recesses 30. The outer diameter of the O-ring 34 is greater than the outer diameter of the end walls 26 and the center land 28 so that the outer circumference of the O-ring 34 sealingly engages the inner circumferential surface of the corresponding axial extension 14. Each of the axial extensions 14 is engaged by one of the two O-rings 34. Each seal 34 is compressed radially between an axial extension 14 and the inner wall of the recess 30 in which it is positioned. The resulting interference fit of the seals 34 seals the interface between the two sections of tubing 4.

The spool 20 floats on and is positioned by the O-ring seals 34. The floating fit of the spool 20 allows the connected tubing sections 4 to deflect relative to each other without impairing the function of the seals 34. In most applications, deflections of up to 2° of the tubing axes relative to each other can be accommodated without affecting the seal. The deflection of the tubing sections 4 is illustrated in FIG. 2. The 2° angle has been exaggerated in FIG. 2 for the purposes of illustration. In addition to allowing deflections of the tubing sections 4 following assembly of the connector 2, the floating fit of the spool 20 also facilitates the assembly procedure.

The connector 2 also includes means for engaging the radial flanges 12 to secure the sections of tubing 4 together. The preferred embodiment of the means for engaging is shown in the drawings. It is the same type of detachable nut assembly shown in FIGS. 7-9 of my U.S. Pat. No. 4,691,944, cited above. The assembly and its functioning are described in the patent and will only be described briefly herein. The assembly includes an externally threaded sleeve 42 and an internally threaded nut 46, referred to as "connector rings" in the patent. Each of these components 42, 46 has an inwardly directed radial flange 44, 48 on its outer end. A retainer ring 50 is positioned between the flange 44, 48 of each nut assembly component 42, 46 and the radial flange 12 of the corresponding ferrule 8. Each ring 50 has a radial portion or head 52 and an axial portion 54.

The procedure for assembling the connector 2 is as follows. With the ferrules 8 already swaged onto the ends of the cylindrical sidewalls 4, the sleeve 42 is slipped onto one of the tubing sections 4 over the ferrule 8, and the nut 46 is slid onto the other tubing section 4. The sleeve 42 and nut 46 have inner diameters greater than the outer diameter of the axial extensions 14 so that they may be readily slid onto the tubing sections 4. With the sleeve 42 and nut 46 positioned on the tubing sections 4, the spool 20 is positioned between the radial flanges 12 and within the axial extensions 14, and the end portions of the tubing sections 4 are brought into close proximity to each other.

A retainer ring 50 is positioned on each tubing section 4 adjacent to the outer radial surface of the flange 44, 48 of the corresponding nut assembly component 42, 46. In installations in which this may be done from the other end of the tubing 4, the ring 50 may be positioned at any time durng this assembly procedure until it is needed. In installations in which the other end of the tubing 4 is not accessible, the retainer ring 50 must be positioned on the tubing sidewall 4 before the ferrule 8 is swaged onto the tubing sidewall 4 or before the other end of the tubing is installed. With the nut assembly component flanges 44, 48 spaced axially from the radial flanges 12, each of the retainer rings 50 is attached to the corresponding sleeve 42 or nut 46 as illustrated in FIG. 6 and described in detail in my previous patent.

With the rings 50 in place and the ferrules 8 in close proximity to and substantially aligned with each other, the nut 46 and the sleeve 42 are brought into position around the axial extensions 14 and are turned to threadedly connect them, as shown in FIG. 4. Preferably, the nut 46 and the sleeve 42 are knurled and do not have wrench flats so that they will be hand tightened. Hand tightening is sufficient to provide a secure connection and helps prevent overtightening and consequent damage to the ferrules 8. As noted above, during the hand tightening procedure, the operator can feel when the end surfaces 16 of the axial extensions 14 come into an abutting relationship and, thereby, knows when to discontinue tightening the nut 46. The abutment of the end surfaces 16 ensures that a minimum gap is maintained between the spool 20 and the radial flanges 12 of the ferrules 8. The clearance for the spool 20 is exaggerated in FIG. 4 for the purposes of illustration. In the preferred embodiment, the minimum total axial clearance is, for example, approximately 0.01 to 0.02 inch. The nominal total radial clearance is, for example, 0.05 plus or minus 0.0005 inch.

Tightening the nut 46 until the end surfaces 16 abut is generally desirable since it ensures that the O-rings 34 are properly positioned relative to the axial extensions 14. However, the abutment of the end surfaces 16 ensures a minimum clearance and does not define a maximum clearance. The seal interface is effective to prevent leaks as long as the O-rings 34 engage the inner circumferential surfaces of the axial extensions 14. When the O-rings 34 are in engagement with such surfaces, the relative tightness of the nut 46 has no effect on the seal. Therefore, the functioning of the connector 2 is not affected if a small gap is left between the end surfaces 16 when the connector 2 is assembled.

Although the preferred embodiment of the invention has been illustrated and described herein, it is intended to be understood by those skilled in the art that various modifications and omissions in form and detail may be made without departing from the spirit and scope of the invention as defined in the following claims.

What is claimed is:

1. A tubing connector comprising:

first and second sections of tubing each comprising a cylindrical sidewall defining a central fluid conveying passageway, and an end portion including an annular outwardly directed radial flange and an annular axial extension projecting axially outwardly from a peripheral portion of said radial flange; said sections being substantially coaxially aligned with their flanges directed toward each other;

an annular spool comprising an inner cylindrical sidewall portion defining a central axial opening, first and second end wall projecting radially outwardly from opposite ends of said sidewall portion, and a center land portion projecting radially outwardly from said sidewall portion between said end walls; said land portion and said end walls defining therebetween first and second outwardly opening radial recesses; and said spool being dimensioned to be received between said radial flanges of said sections and within said axial extensions, with said opening aligned with said passageways, and with clearance between said spool and said radial flanges and between said spool and said axial extensions;

first and second annular seals positioned in said first and second recesses, respectively, and sealingly engaging said sidewall portion of the spool and said axial extensions of said first and second sections of tubing, respectively; and means for engaging said radial flanges to detachably secure said sections together;

said spool and said seals being dimensioned to provide an axial clearance between the spool and the radial flanges to cause the spool to float on and be positioned by the seals when said sections are secured together, to allow said sections to deflect relative to each other while maintaining sealing engagement between the seals and the spool and said axial extensions.

2. A connector as described in claim 1, in which, in each said section of tubing, said radial flange and said axial extension are formed by a ferrule that is swaged onto said cylindrical sidewall.

3. A connector as described in claim 1, in which each said axial extension has an outer radial end surface, and said end surfaces abut each other to define the axial distance between said radial flanges and maintain a minimum axial clearance between the spool and said radial flanges.

4. A connector as described in claim 1, in which each said seal is an O-ring.

* * * * *

UNITED STATES PATENT AND TRADEMARK OFFICE
CERTIFICATE OF CORRECTION

PATENT NO. : 4,852,917
DATED : August 1, 1989
INVENTOR(S) : Wilton S. Viall, Jr.

It is certified that error appears in the above-identified patent and that said Letters Patent is hereby corrected as shown below:

Column 1, line 10, "with" should be -- within --.
Column 1, line 26, "aricraft" should be -- aircraft --.
Column 4, line 13, "for" should be -- from --.
Column 5, line 2, "5 and 5" should be -- and 5 --.
Column 5, line 15, "wall 26" should be -- walls 26 --.
Column 5, line 16, "extend" should be -- extent --.
Column 5, line 23, "flanges 132" should be -- flanges 12 --.
Column 6, line 15, "durng this" should be -- during the --.
Claim 1, column 7, line 12, "wall" should be -- walls --.

Signed and Sealed this

Thirtieth Day of January, 1990

Attest:

JEFFREY M. SAMUELS

Attesting Officer     Acting Commissioner of Patents and Trademarks